March 1, 1966   F. R. WILSON   3,237,301
TUBE CUTTING TOOL HAVING ADJUSTABLE CUTTER
AND ADJUSTABLE TUBE SUPPORTING BASE
Filed Nov. 6, 1963                                    2 Sheets-Sheet 2

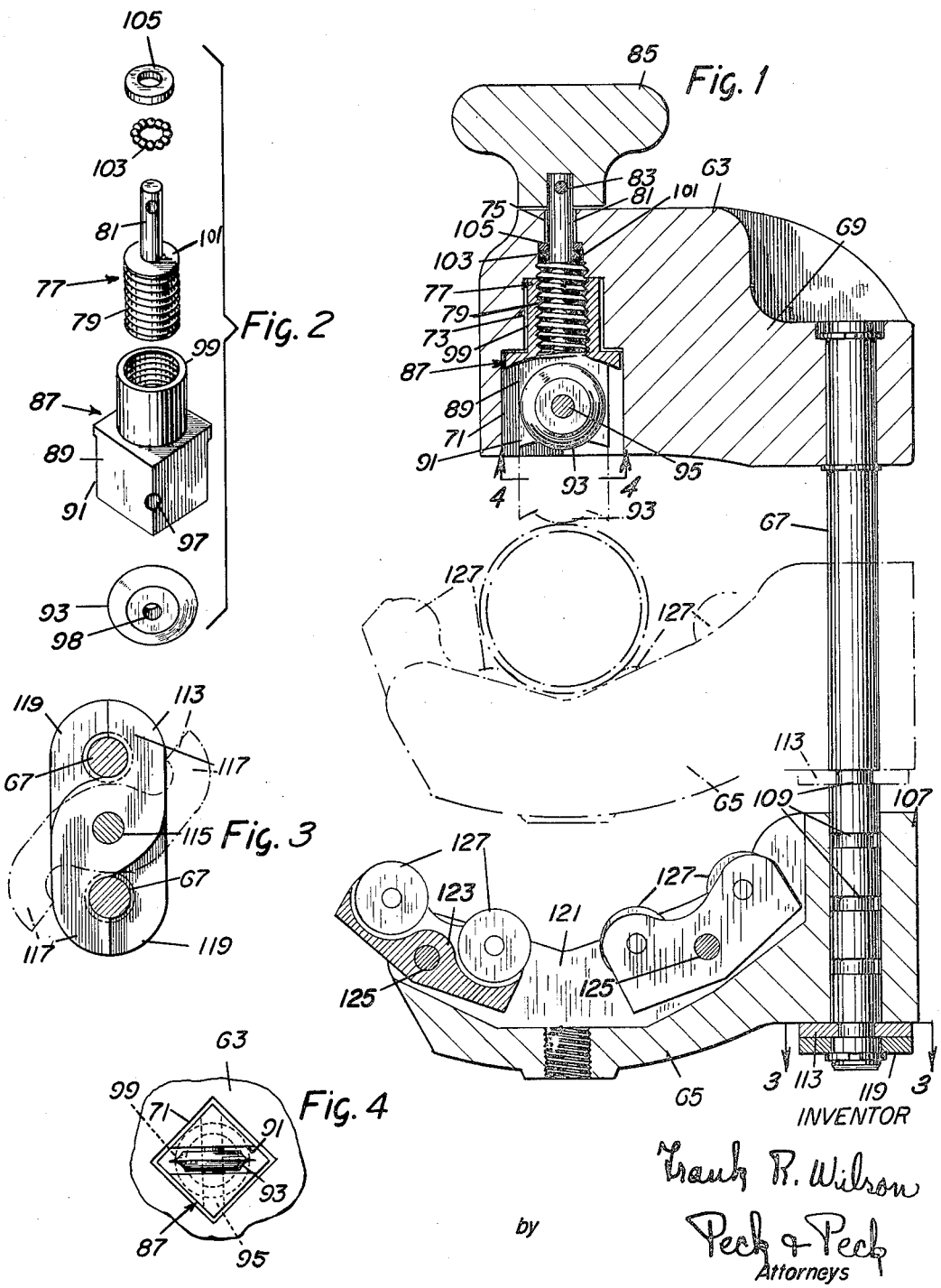

INVENTOR:
FRANK R. WILSON
BY
Harrington A. Lackey
ATTORNEY 3,237,301
TUBE CUTTING TOOL HAVING ADJUSTABLE CUTTER AND ADJUSTABLE TUBE SUPPORTING BASE
Frank R. Wilson, Memphis, Tenn., assignor to Parker-Hannifin Corporation, Cleveland, Ohio, a corporation of Ohio
Filed Nov. 6, 1963, Ser. No. 322,551
5 Claims. (Cl. 30—102)

This application is a continuation-in-part of original application S.N. 159,252, filed December 14, 1961, now abandoned. This invention relates to a tube cutter, and more particularly to a manually operated and portable tube cutter of greater versatility and accuracy than tube cutters heretofore known.

One object of this invention is to provide a tube cutter capable of making smaller tolerances than have heretofore been possible.

Another object of this invention is to provide a tube cutter capable of cutting tubes having a varying range of diameters.

Another object of this invention is to provide a novel tube cutter frame for aligning and limiting the reciprocable movement of the tube supporting base toward and away from the cutter head.

Another object of this invention is to provide a unique mounting and feed arrangement for the cutter wheel in the cutter head to retract the cutter wheel within the cutter head for protection and to project the cutter wheel beyond the cutter head for operation upon a tube.

A further object of this invention is to provide in a tube cutter, means for selectively and independently moving both the cutter wheel and the tube supporting base with respect to the cutter head.

Another object of this invention is to provide means in a tube cutter for adjustably mounting the tube supporting base for reciprocable movement toward and away from the cutter head, with means for locking the tube supporting base in various adjusted positions relative to the cutter head.

A further object of this invention is to provide in a tube cutting tool, a cutter head and a tube supporting base connected by a supported or gauge bar provided with latch means for adjustably supporting the supporting base in various fixed positions relative to the cutter head, and for feeding the cutter and the cutter head toward and away from the supporting base, in order to accommodate and cut tubes of various diameters.

Further objects and advantages of the invention will be apparent from the following description, taken in conjunction with the drawings, wherein:

FIG. 1 is a side sectional elevation of another embodiment of the invention;

FIG. 2 is an exploded view of the cutter mounting and feed mechanism employed in the embodiment of FIG. 1;

FIG. 3 is a section taken along the line 3—3 of FIG. 1;

FIG. 4 is a view taken along the line 4—4 of FIG. 1;

Figures 5, 6:
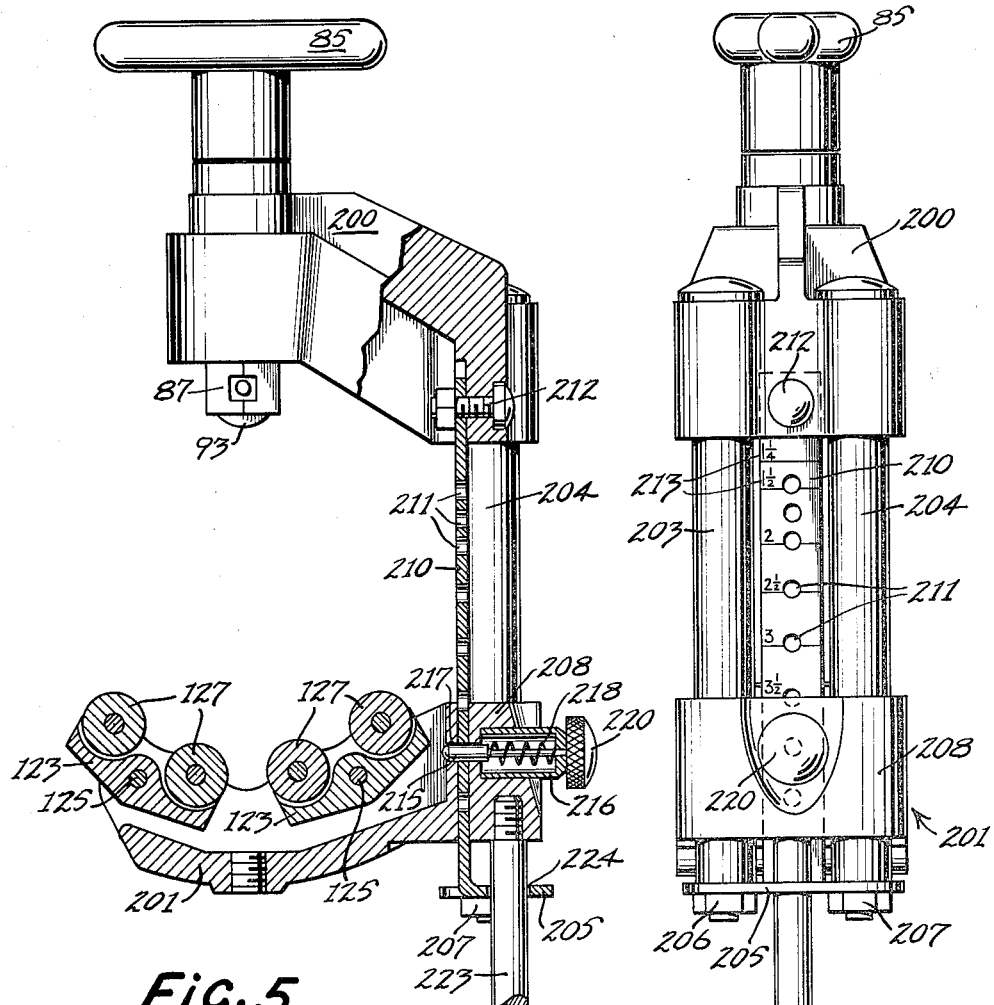
FIG. 5 is a side elevation, partially in section, of another embodiment of the invention similar to FIG. 1, but disclosing another mounting means for the tube supporting base.
FIG. 6 is a rear elevation of the embodiment disclosed in FIG. 5.

Referring now to the embodiment of the invention disclosed in FIGS. 1–4, this tube cutter comprises a cutter head 63, a tube supporting base 65 and a pair of, supporting bars, posts or columns 67 which connect and mount the head 63 and base 65 for relative movement toward and away from each other.

The head 63 is fixed to the top ends of the posts 67 by means of an arm 69 which is preferably, though not necessarily, formed integral with the head 63.

A series of coaxial openings or cavities 71, 73 and 75 are formed to extend entirely through the front portion of the cutter head 63 from top to bottom, parallel to the rods 67. The lower cavity 71 is formed of substantially square cross-section. The circular intermediate opening 73 communicates with and has a reduced cross-section from the cavity 71, and the circular opening 75 opens into and is of smaller diameter than the intermediate opening 73.

Operatively mounted in the openings 75 and 73 is a feed screw 77 having an externally threaded portion 79, which has a left hand thread, and an unthreaded stem 81 of reduced diameter extending upwardly above the top of the cutter head 63. Fixed to the projecting end of stem 81 by means of a set screw 83 is an operating handle 85 for rotating the feed screw 77.

A cutter wheel carrier 87, preferably made of square stock, includes a square body 89 through which a slot 91 is milled for receiving the rotatable cutter wheel 93. The cutter wheel 93 is rotatably journaled within the slot 91 by means of pin 95 inserted through holes 97 formed in the body 89 transversely of the slot and extending through the hole 98 in the cutter wheel 93. The upper portion 99 of carrier 87 is turned round and is tapped to provide a left-hand internally threaded neck. The carrier 87 is positioned in the head 63 by threadedly engaging the threaded portion 79 of the feed screw 77 with the internally threaded portion of the neck 99. When the feed screw 77 is threaded to its full depth, then the upper edge of the neck 99 will abut against the top face of the opening 73 so that the neck 99 is substantially fully contained within the opening 73. The body portion 89 of the carrier 87 is also completely contained within the cavity 71, so that the bottom edge of the carrier 87 as well as the periphery of the cutter wheel 93 are fully contained within the cavity 71 and above the bottom face of the cutter head 63. In this retracted position, the peripheral cutting edge or blade of the cutter wheel 93 is fully protected.

The upper end 101 of the threaded portion 79 of the feed screw 77 forms a race for ball bearings 103 upon which rests a thrust washer 105 within an enlarged recess formed in the opening 75 above the circular cavity 73.

When the feed screw 77 is rotated to unthread the portion 79 from the neck 99, the carrier 87 and the cutter wheel 93 are gradually projected downwardly beyond the bottom face of the cutter head 63 to a phantom line position disclosed in FIG. 1 for operative engagement with a tube.

The tube supporting base 65 is adjustably mounted on posts 67 by means of an extending member 107 having mating openings therethrough for slidably embracing the posts 67. A plurality of axially spaced circumferential grooves 109 are formed on each post 67, the grooves 109 on both posts 67 being transversely aligned.

A locking member 113 is fixed by a screw 115 to member 107 for pivotal movement about an axis parallel to and between the posts 67. The ends of the locking member 113 form hooks 117 facing in opposite directions for engagement with a transversely aligned pair of grooves 109 on the post 67 at various axially adjusted positions. An end plate 119 is fixed in any suitable manner to the ends of the posts 67 to stop the downward movement of the roller supporting base 65. By swinging the locking member 113 to the phantom position of FIG. 3, the hooks 117 are disengaged from their corresponding grooves so that the base 65 may be slidably moved freely along the posts 67. When the base 65 is adjusted to the desired position, the locking member 117 is again swung to the solid line position of FIG. 3 where the hook ends will engage the aligned pair of grooves 109.

The base 65 is provided with a pair of upstanding flanges 121 between which are rockably mounted the roller cradles 123 by means of pins 125 journaled through the opposing flanges. A pair of rollers 127 are rotatably supported in each cradle 123. The cradles 123 are adapted to pivot in the same plane as the rotary plane of the cutting wheel 93. The rockable cradles 123 permit self-adjustment of the rollers 127 for tubes of varying diameters. For tubes of relatively small diameters, the rocking cradles 123 will "bottom out" and the small tubes will be properly supported only on the opposing innermost rollers 127 of each cradle 123. Larger tubes, will be supported on all the rollers 127.

In this embodiment of the tube cutter disclosed in FIGS. 1–4, both the tube supporting base 65 and the cutter wheel 93 are capable of independent movement relative to the cutter head 63, toward and away from the tube to be cut. These two movements reduce the length or the height of the tool without sacrifice of the ability to work on tubes of substantial diameters.

One of the ingenious features of this embodiment of the invention resides in the construction of the cutter head 63 for completely housing the cutter wheel 93 within the cavity 79 when the tool is not in use, to eliminate possible damage to the cutter wheel 93. Not only is the cutter wheel 93 adapted to be projected and retracted within the cutter head 63 by means of the feed screw arrangement, but the feed screw 77 is adapted to operate without any axial movement relative to the cutter head 63. The handle 85 may be mounted adjacent the top of the cutter head 63 and may be freely rotated without either moving toward or away from the cutter head 63 while projecting and retracting the cutter wheel 93. Thus, the reciprocal movement of the cutter wheel 93 does not involve the extension of the over-all height or length of the tool, which does occur in other tube cutters where the feed screw directly threadedly engages the cutter head itself. This improvement in cutter head feeding without changing the over-all length of the tool is effected by threading the feed screw 77 into the cutter wheel carrier 87, and not into the openings 71, 73 or 75.

Figure 7:
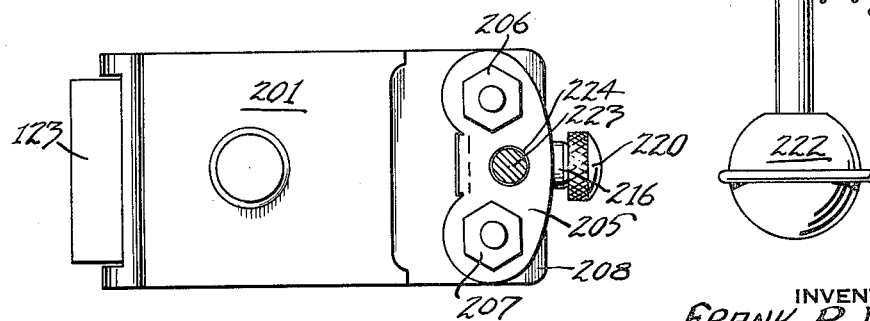
FIG. 7 is a bottom plan view of the embodiment disclosed in FIG. 6.

FIGS. 5–7 disclose a further modification of the tool disclosed in FIG. 1, and the same reference numbers will identify similar parts in this modification.

The cutter head 200 employs the same handle 85, carrier 87, cutter wheel 93, and feed screw arrangement as disclosed in FIG. 1. Moreover, the tube supporting base, or frame, 201 pivotally supports the same cradles 123 by means of the pivot pins 125 for rotatably supporting the pairs of rollers 127. Furthermore, the cutter head 200, the tube supporting base 201, the cutter wheel 93 and the rollers 127 cooperate in the same manner as those disclosed in FIG. 1 to operate upon a tube.

However, the means for connecting cutter head 200 to the tube supporting base 201 comprises a pair of supporting bars, guide rods or posts 203 and 204, the upper ends of which are fixed in the cutter head 200. The lower ends of these rods 203 and 204 are rigidly secured in parallel arrangement by having reduced threaded ends extending through mating apertures in the transverse cap 205, the threaded end portions being secured by the nuts 206 and 207. The guide rods 203 and 204 extend through mating openings, not shown, in the extending member or hub 208 of the base 201 for slidable engagement therewith.

An elongated gauge or supporting bar 210, provided with precisely longitudinally spaced apertures 211, has its upper end rigidly fixed to the cutter head 200 by means such as the threaded nut and bolt 212, and is integrally fixed at its lower end to the cap 205. The gauge bar 210 is preferably mounted parallel and susbtantially equally spaced between the guide rods 203 and 204. As disclosed in FIG. 5, a mating opening is formed in the hub 208 for slidably receiving the gauge bar 210. Indicia such as the numerals 213 are formed on the gauge bar 210 adjacent each corresponding aperture 211 to locate the adjusted position of the roller supporting head 201 for supporting a tube of corresponding diameter to be cut by the cutter wheel 93.

In order to lock the supporting base 201 in each vertically adjusted position represented by the apertures 211, a plunger 215 is mounted for lateral reciprocation within a casing 216 and coaxial opening 217 through the extending member 208. The plunger 215 is forwardly biased by means of the spring 218 contained within the casing 216 so that when the opening 217 in the extending member 208 is aligned with any of the apertures 211, the plunger 215 will be automatically forced through the aligned aperture 211 and opening 217 by means of the spring 218. To unlock the base 201 from the gauge bar 210, the plunger head 220 may be manually moved to the rear to withdraw the plunger 215 from the mating aperture 211. The tube supporting base 201 may then be moved longitudinally of the gauge bar 210 by manually grasping and thrusting the knob 222 fixed to the elongated handle rod 223 depending from the bottom of the extending member 208 and slidably received by an opening 224 in the cap 205. Thus, the tool disclosed in FIGS. 5–7 discloses another structure for accurately adjusting the rollers 127 with respect to the cutter head 200 for accommodating tubes of varying diameters.

From the foregoing description, it will be apparent that a novel tube cutter of greater simplicity and versatility and capable of operating upon tubes having a greater diameter range and in limited working areas has been provided.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. A tube cutter comprising:
   (a) a cutter head,
   (b) a tube supporting base,
   (c) at least two elongated supporting bars having upper ends and lower ends,
   (d) said upper ends being fixed in said cutter head so that said supporting bars depend therefrom parallel to each other,
   (e) means in said base for slidably receiving said supporting bars to permit movement of said base longitudinally of said bars toward and away from said cutter head,
   (f) means on said base for locking said base in various longitudinally adjusted positions on one of said bars,
   (g) a cutter wheel in said cutter head, and
   (h) means for feeding said cutter wheel toward and away from said base.

2. The invention according to claim 1 in which said locking means comprises lock receiving means at longitudinally spaced positions on said one bar, and a locking member reciprocably mounted on said base for engaging said receiving means at said longitudinally spaced positions.

3. The invention according to claim 1 comprising three elongated supporting bars including a central bar and two guide bars spaced equidistantly on opposite sides of said central bar, said central bar being said one bar having said lock receiving means.

4. The invention according to claim 3 further comprising a transverse cap fixed to the lower ends of said three supporting bars, and below said tube supporting base.

5. The invention according to claim 4 further comprising an elongated handle rod fixed to and depending from said tube supporting base and parallel to said supporting bars, and means in said transverse cap for slidably receiving said handle rod.

References Cited by the Examiner

UNITED STATES PATENTS

| | | | |
|---|---|---|---|
| 575,688 | 1/1897 | Brockett | 30—102 |
| 1,012,304 | 12/1911 | Vinton | 30—102 |
| 1,510,611 | 10/1924 | Schang | 30—94 |
| 2,071,756 | 2/1937 | Manville | 30—102 |
| 2,582,406 | 1/1952 | Bachli et al. | 30—102 |
| 2,629,926 | 3/1953 | Franck | 30—102 |
| 2,706,853 | 4/1955 | Wilson | 30—102 |
| 3,013,335 | 12/1961 | Kowal | 30—102 X |

WILLIAM FELDMAN, *Primary Examiner.*

MYRON C. KRUSE, *Examiner.*